INVENTORS
LOUIS FRANCOIS JUMELLE
AND PIERRE CHARLES FRÉDÉRIC ANDRÉ

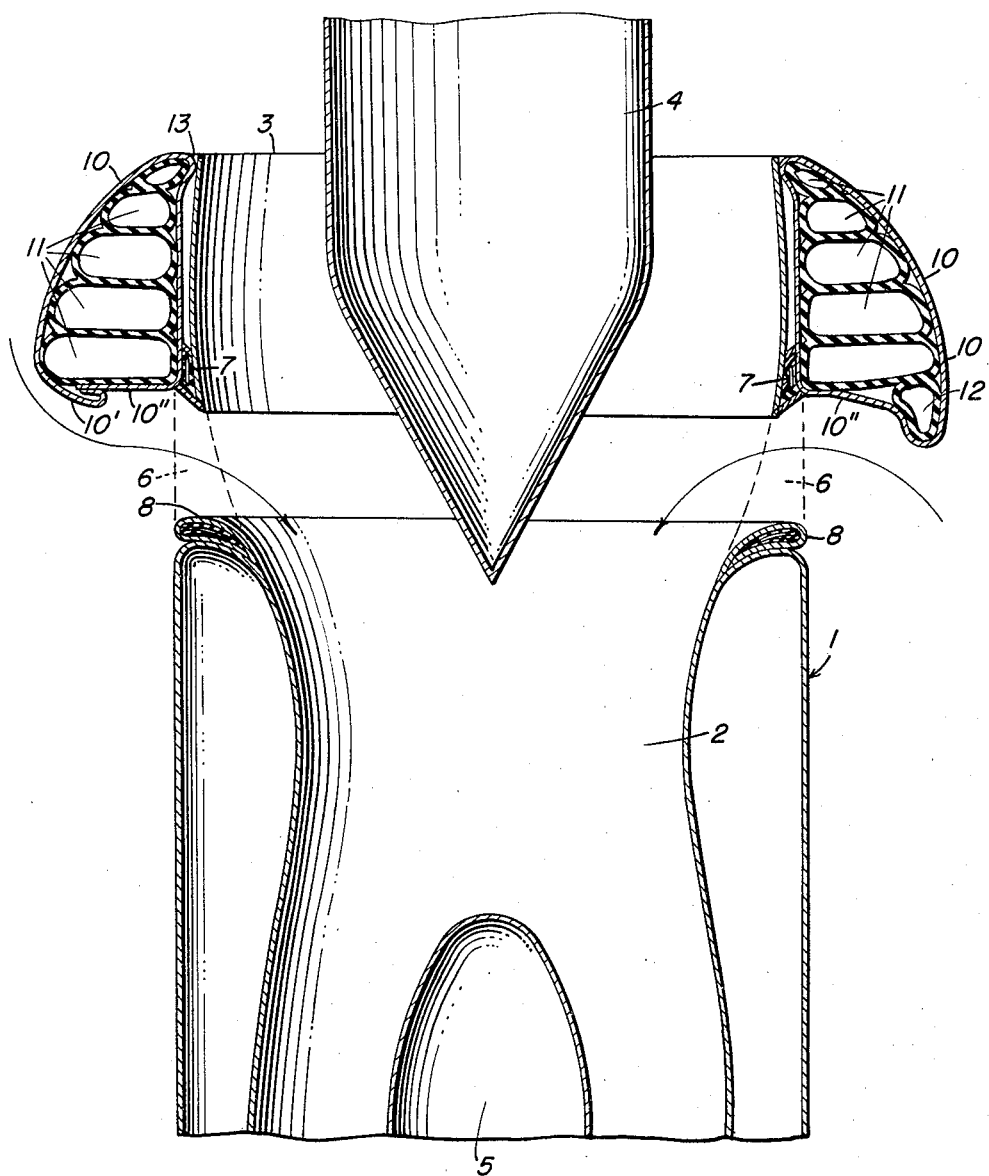

United States Patent Office 2,960,281
Patented Nov. 15, 1960

2,960,281

CONTROL DEVICE FOR THE AIR INTAKE OF A JET PROPULSION UNIT

Louis Francois Jumelle, Paris, and Pierre Charles Frédéric André, Dammary les Lys, France, assignors to Societe Nationale d'Etude et de Construction de Moteurs d'Aviation, Paris, France, a company of France Filed Mar. 17, 1958, Ser. No. 721,912

Claims priority, application France Mar. 20, 1957

2 Claims. (Cl. 244—23)

The air intake sleeves of reaction propulsion engines are in general so designed as to attain an optimum efficiency at the cruising speeds of the aircraft in flight. It follows that their efficiency, and hence the thrust of the reaction propulsion engine, are reduced when operating the latter at a stationary point, the dynamic pressure owing to the movement of the aircraft then being non-existent.

In the case of aircraft taking-off and landing vertically the losses in thrust suffered from a bad supply of air to the reaction propulsion engine in the course of a descent in the reverse are even greater than at a stationary point. Moreover any increase in the speed of vertical descent expresses itself in a new reduction of thrust, which fact involves an unstable evolution and a great difficulty in control.

It is particularly important with such aircraft to be able to increase the supply of air at a stationary point or at low speeds.

The present invention relates to pneumatic control devices for the air intake into a reaction propulsion engine, comprising one or more inflatable bodies operated in such a manner as to modify the profile and the effective intake area of the reaction propulsion engine, depending on whether these bodies are inflated or more or less deflated.

In accordance with the invention, lateral ports or passages are provided through the intake sleeve of the reaction propulsion engine for providing an additional path of admission for the ambient air, these ports or passages being normally obturated by means of inflatable bodies, in such a manner that the admission of air then takes place solely through the frontal orifice of the intake sleeve.

According to an improvement applicable in a particularly advantageous manner to aircraft designed for vertical take-off and landing, the radius of curvature of the leading edge of the intake sleeve is increased by the lateral development of the outer surface of the said sleeve by means of inflatable bodies. The portion thus inflated by the intake sleeve is advantageously constructed in such a manner as to assure a good recuperation of the dynamic pressure at negative speeds, that is to say at the vertical flight of descent.

Inflatable bodies or elements capable of passing from an operative position into an inoperative position depending on whether they are deflated or inflated have already been described in the French patent specifications of Mr. Soyer: Nos. 832,912 of May 26, 1937, 997,817 of July 31, 1945, and 1,069,052 of October 23, 1952, within the scope of certain applications defined by these patent specifications, to wit: floats for seaplanes, hypersustenation devices for aircraft and retractable brake members for engines moving in a fluid.

The present invention is accordingly characterised by a new application of inflatable bodies and by an adaptation of these bodies with a view to making them play a part and achieving a result different from those attained hitherto.

The following description of an embodiment given by way of example but not of limitation will make it quite clear how the invention may be carried out.

Figure 2 shows the corresponding arrangement for operation at a stationary point or at low speeds, with the lateral ports open.

Figure 1:
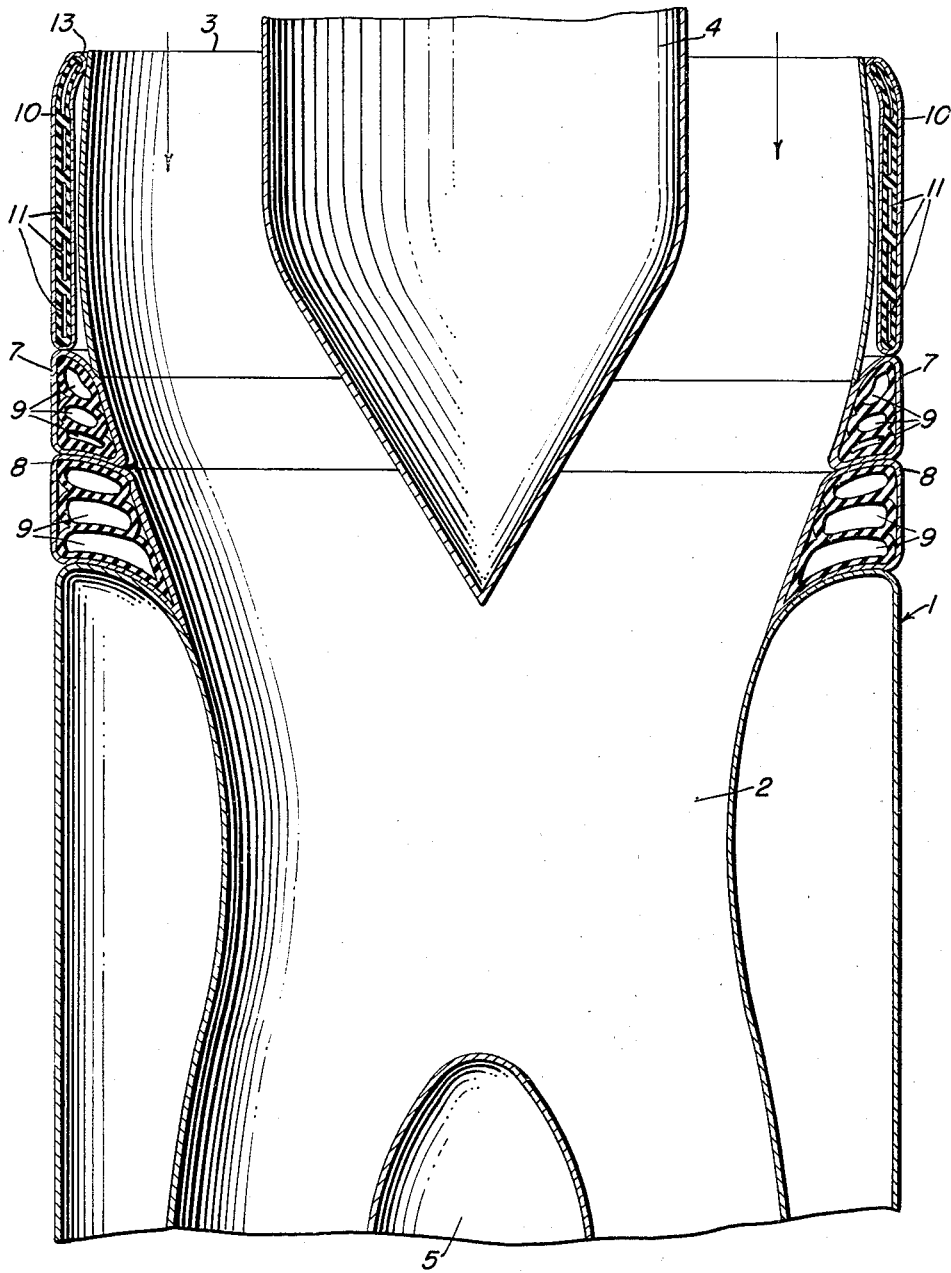
Figure 1 is a diagrammatic longitudinal section of an intake sleeve of a reaction propulsion engine in ordinary flight, the lateral ports being closed.

The intake sleeve illustrated in the drawings comprises a fairing 1 bounding a duct 2 open to the atmosphere through an orifice 3 which is for example frontal and of annular shape surrounding a central body 4; however this orifice may have any other shape. This central body may be a nacelle supporting the pilot's cockpit. The air entering according to the arrows is guided by the duct 2 towards the reaction propulsion engine proper the central cap of which is shown at 5.

The intake sleeve has lateral openings or ports 6 arranged through the fairing 1, behind the frontal orifice 3.

Along the opposite margins of these ports 6 deformable envelopes 7 and 8 are fixed, each of which contains several inflatable cells or bodies 9, operated in such a manner that when the cells 9 are inflated (position shown in Figure 1), the elements 7 and 8 offer internal and external surfaces lining up with the adjacent surfaces of the fairing 1 and obturating in a tight manner the ports 6.

Moreover the end portion 10 of the external surface of the fairing 1 is itself deformable, and belongs likewise to an envelope containing inflatable bodies 11.

The envelope 10 comprises a rearward extension 10' surrounding an inflatable body 12.

The device described hereinabove operates in the following manner:

During the ordinary flight of the aircraft at high speed the cells 9 contained in the envelopes 7 and 8 are inflated in such a manner, that these envelopes obturate the lateral ports 6' (see Figure 1). The area offered to the admission of air is then that of the frontal orifice 3.

On the other hand, at a stationary point or at a flight at low speed, particularly at the vertical take-off or landing of aircraft designed for such manoeuvres, the cells 9 of the envelopes 7 and 8 are deflated and collapse as shown in Figure 2, thus uncovering the lateral ports 6. The area of the ports 6 is thus added to that of the frontal orifice 3 for the admission of air to the reaction propulsion engine, and this considerable enlargement permits to reduce the pressure losses (and hence the losses in thrust of the reaction propulsion engine) due to too high velocities in the intake area.

The intake pressure losses can be further reduced in these flight conditions by inflating the cells 11 acting on the deformable envelope 10, which has the effect of substantially increasing the radius of curvature of the leading edge 13 of the intake sleeve with a view to likewise reducing the excess-velocities and preventing the detachments from sharp leading edges.

Moreover the rear face 10" of the envelope 10 constitues a deflector assisting the entry of air into the duct 2 through the ports 6, this effect being particularly marked at negative speeds of the aircraft, that is to say when it moves in the reverse during the manoeuvre of landing vertically.

The action of guidance and deflection exercised by the rear face 10" may be increased by giving it certain concavity. This is attained by inflation of the cell 12 situated in the extension 10' of the envelope 10.

At the take-off, however, it is not necessary to inflate the cell 12, the extension 10' then remaining collapsed as shown on the left hand side of Figure 2.

The deflation of the cells 11 and 12 when using the supplementary ports avoids an increased drag at high speed flights.

The inflation of the cells may be effected by the aid of bottles of compressed air, of a compressor, and in particular of the compressor of the reaction propulsion engine itself, or of any other known device, and of a suitable system of pipe lines.

The opening and closing of the supplementary ports may be effected either by the pilot's action on a control, or by an automatic device action in response to the speed of flight or in function of the depression prevailing at a range judiciously chosen of the intake system or in response to the attitude of the aircraft (vertical or horizontal flight).

What is claimed is:

1. In a vertical take-off and landing aircraft capable of descending rearwardly and powered by an air breathing engine, an air intake casing ending with an inlet orifice facing in a forward direction with respect to said aircraft, a lateral passageway through said casing connecting a part thereof downstream of said inlet orifice with the atmosphere, an inflatable device in said passageway for obturating the same when said device is inflated and for opening the passageway when the device is deflated, and retractable means, on the outside of the intake casing, between the inlet orifice and the passageway, to form a laterally projecting deflector surface designed for urging the relative airflow into said passageway during rearward descent of the aircraft.

2. The arrangement of claim 1, wherein the retractable means comprise an extensible and collapsible envelope, a part of which forms the deflector surface when said envelope is extended, and inflatable cells housed in said envelope.

References Cited in the file of this patent

UNITED STATES PATENTS

| | | |
|---|---|---|
| 2,699,906 | Lee et al. | Jan. 18, 1955 |
| 2,763,426 | Erwin | Sept. 18, 1956 |
| 2,780,913 | Nicks | Feb. 12, 1957 |

FOREIGN PATENTS

| | | |
|---|---|---|
| 1,003,096 | France | Nov. 14, 1951 |